(12) United States Patent
Eaton

(10) Patent No.: US 11,731,691 B2
(45) Date of Patent: Aug. 22, 2023

(54) REAR END STEERING AND MOUNTING SYSTEM

(71) Applicant: Super ATV, LLC, Madison, IN (US)

(72) Inventor: Justin Eaton, Hanover, IN (US)

(73) Assignee: Super ATV, LLC, Madison, IN (US)

( * ) Notice: Subject to any disclaimer, the term of this patent is extended or adjusted under 35 U.S.C. 154(b) by 271 days.

(21) Appl. No.: 17/016,803

(22) Filed: Sep. 10, 2020

(65) Prior Publication Data

US 2021/0070354 A1 Mar. 11, 2021

Related U.S. Application Data

(60) Provisional application No. 62/898,592, filed on Sep. 11, 2019.

(51) Int. Cl.
*B62D 5/26* (2006.01)
*B60G 3/20* (2006.01)
(Continued)

(52) U.S. Cl.
CPC .................. *B62D 5/26* (2013.01); *B60G 3/20* (2013.01); *B60G 7/001* (2013.01); *B62D 5/065* (2013.01);
(Continued)

(58) Field of Classification Search
CPC .......... B62D 5/26; B62D 5/065; B62D 7/228; B60G 3/20; B60G 7/001; B60G 2200/144;
(Continued)

(56) References Cited

U.S. PATENT DOCUMENTS 1,396,102 A * 11/1921 Dunham .............. B60K 17/306
180/257
1,974,036 A * 9/1934 Ammen .................. B62D 9/00
267/248
(Continued)

FOREIGN PATENT DOCUMENTS

RU 2163209 2/2001

OTHER PUBLICATIONS

English Translation of RU 2163209, retrieved Sep. 11, 2020.

*Primary Examiner* — Drew J Brown
*Assistant Examiner* — Timothy Wilhelm
(74) *Attorney, Agent, or Firm* — Woodard, Emhardt, Henry, Reeves & Wagner, LLP

(57) ABSTRACT

A steering and suspension assembly for the rear wheels of an off-road vehicle includes: a) a first suspension component; b) a first steering component; c) a CV axle; d) a portal box assembly; e) a hydraulic steering assembly for moving the first steering component a distance effective to turn the vehicle at least 2° in either direction when the assembly is mounted to a wheel hub; f) a first suspension connection bracket for connecting the first suspension component to the rear wall of the portal box assembly; and g) a first steering connection bracket for connecting the first steering component to the rear wall of the portal box assembly. The portal box assembly includes: i) a housing having a rear wall, a front wall, and a side wall, wherein the rear wall includes a vehicle axle opening effective to receive the end of said CV axle, and wherein the front wall includes an output shaft opening effective to allow an output shaft to extend outward from the housing; ii) a linking mechanism housed in the housing and effective for linking a CV axle received in the vehicle axle opening to an output shaft; and iii) an output shaft operably connectable via the linking mechanism to the (Continued)

CV axle, and effective to rotate upon rotation of the stock axle.

17 Claims, 19 Drawing Sheets

(51) Int. Cl.
| | | |
|---|---|---|
| *B60G 7/00* | (2006.01) | |
| *B62D 5/065* | (2006.01) | |
| *F16D 3/16* | (2006.01) | |
| *G01D 5/14* | (2006.01) | |
| *G01D 5/22* | (2006.01) | |
| *G01P 3/48* | (2006.01) | |
| *B60K 35/00* | (2006.01) | |
| *B62D 7/22* | (2006.01) | |

(52) U.S. Cl.
CPC .............. *F16D 3/16* (2013.01); *G01D 5/145* (2013.01); *G01D 5/2291* (2013.01); *G01P 3/48* (2013.01); *B60G 2200/144* (2013.01); *B60G 2202/31* (2013.01); *B60G 2204/148* (2013.01); *B60G 2206/124* (2013.01); *B60G 2300/07* (2013.01); *B60K 35/00* (2013.01); *B60K 2370/167* (2019.05); *B62D 7/228* (2013.01)

(58) Field of Classification Search
CPC .......... B60G 2202/31; B60G 2204/148; B60G 2206/124; B60G 2300/07; B60G 2200/42; B60G 2200/44; B60G 2200/4622; B60G 2206/50; B60G 2300/124; B60G 2300/13; F16D 3/16; G01D 5/145; G01D 5/2291; G01P 3/48; B60K 2370/167; B60K 35/00
See application file for complete search history.

(56) References Cited

U.S. PATENT DOCUMENTS

| | | | | |
|---|---|---|---|---|
| 3,983,951 A * | 10/1976 | Guerra | ............... | B60K 17/30 180/256 |
| 4,344,501 A * | 8/1982 | Jerry | ............... | B60K 17/30 74/606 R |
| 4,902,033 A * | 2/1990 | Tonomura | ............... | B60G 3/26 280/124.1 |
| 5,020,627 A | 6/1991 | Wittke | | |
| 5,174,595 A * | 12/1992 | Snipes | ............... | B62D 7/142 280/99 |
| 5,288,091 A * | 2/1994 | Deschamps | ............... | B62D 7/15 180/409 |
| 5,845,926 A * | 12/1998 | Davis | ............... | B60G 3/26 280/124.136 |
| 6,131,689 A * | 10/2000 | Nodorft | ............... | B62D 7/142 180/234 |
| 6,292,094 B1 * | 9/2001 | Deng | ............... | B62D 7/159 701/44 |
| 6,625,529 B2 * | 9/2003 | Obata | ............... | B62D 6/00 180/408 |
| 6,684,974 B1 * | 2/2004 | Ulschmid | ............... | B62D 7/142 280/91.1 |
| 6,722,994 B2 * | 4/2004 | Woods | ............... | B60G 7/00 180/359 |
| 6,761,234 B1 * | 7/2004 | Lamela | ............... | B62D 7/142 280/8 |
| 7,073,620 B2 * | 7/2006 | Braun | ............... | B62D 7/1518 280/91.1 |
| 7,249,418 B2 | 7/2007 | Bartscht et al. | | |
| 7,316,288 B1 * | 1/2008 | Bennett | ............... | B62K 5/08 180/413 |
| 7,347,434 B2 * | 3/2008 | Lewis | ............... | B62D 7/142 180/409 |
| 7,354,053 B2 * | 4/2008 | Satou | ............... | B60G 7/02 280/124.135 |
| 8,485,543 B2 | 7/2013 | Richardson et al. | | |
| 8,651,223 B2 * | 2/2014 | Mergener | ............... | B62D 7/142 280/103 |
| 8,950,763 B2 | 2/2015 | Jakob | | |
| 8,985,264 B2 * | 3/2015 | Shirley | ............... | B60K 17/043 180/371 |
| 10,479,156 B2 * | 11/2019 | Eaton | ............... | B60K 17/04 |
| 10,527,130 B2 * | 1/2020 | Shirley | ............... | B60K 17/043 |
| 11,148,493 B2 * | 10/2021 | Riedel | ............... | B60G 3/06 |
| 11,299,042 B2 * | 4/2022 | Stephan | ............... | F16H 57/028 |
| 11,352,055 B2 * | 6/2022 | De Grammont | ....... | B60K 17/20 |
| 11,364,759 B1 * | 6/2022 | Johnson | ............... | B60G 7/003 |
| 11,383,573 B2 * | 7/2022 | Zink | ............... | B60G 3/01 |
| 11,414,127 B2 * | 8/2022 | Funke | ............... | B62D 6/001 |
| 2010/0211261 A1 * | 8/2010 | Sasaki | ............... | B60G 17/016 701/37 |
| 2013/0093154 A1 * | 4/2013 | Cordier | ............... | B60G 3/20 280/124.109 |
| 2014/0229072 A1 * | 8/2014 | Kang | ............... | B62D 7/159 701/42 |
| 2017/0097084 A1 * | 4/2017 | Eaton | ............... | B60K 17/04 |
| 2018/0251123 A1 * | 9/2018 | Sigmar | ............... | H02K 11/33 |
| 2020/0130741 A1 * | 4/2020 | Crowley | ............... | B62D 7/06 |
| 2021/0380156 A1 * | 12/2021 | Yu | ............... | B62D 9/00 |
| 2021/0402875 A1 * | 12/2021 | Pham | ............... | B62D 7/14 |

\* cited by examiner

REAR END STEERING AND MOUNTING SYSTEM

REFERENCE TO RELATED APPLICATIONS

This application claims priority from Provisional Patent Application No. 62/898,592, filed Sep. 11, 2019, the entire contents of which are hereby incorporated herein by reference.

FIELD OF THE INVENTION

The present invention relates generally to off road vehicles such as an all-terrain vehicles (ATV) and utility task vehicles (UTV), and more particularly to a suspension and steering assembly for the rear end of such vehicles.

BACKGROUND OF THE INVENTION

ATV and UTV vehicles typically are driven and steered through their front wheels, causing the turning radius for such vehicles to be wide.

The ability to steer all four wheels would allow the vehicle to turn in a tighter radius, but prior art four-wheel steering mechanism are unsuitable for the demands of high performance, off-road ATVs and UTVs.

A need therefore exists for a suspension and steering assembly for the rear end of ATVs and/or UTVs to reduce the turning radius while improving the handling and ride of the vehicle. The present invention addresses that need.

SUMMARY OF THE INVENTION

Briefly describing one aspect of the present invention, there is provided a steering and suspension assembly for the rear wheels of an off-road vehicle. In one embodiment the steering and suspension assembly comprises:
  a) a first suspension component;
  b) a first steering component;
  c) a CV axle;
  d) a wheel hub assembly;
  e) a first suspension connection bracket for connecting the first suspension component to the wheel hub assembly;
  f) a first steering connection bracket for connecting the first steering component to the wheel hub assembly; and
  g) a hydraulic steering assembly for moving the first steering component a distance effective to turn the vehicle at least 2° in either direction when the assembly is mounted to a wheel hub.

In some embodiments the wheel hub assembly comprises a portal gear box assembly. The preferred portal gear box assembly comprises:
  i) a housing having a rear wall, a front wall, and a side wall, wherein the rear wall includes a vehicle axle opening effective to receive the end of said CV axle, and wherein the front wall includes an output shaft opening effective to allow an output shaft to extend outward from the housing;
  ii) a linking mechanism housed in the housing and effective for linking a CV axle received in the vehicle axle opening to an output shaft; and
  iii) an output shaft operably connectable via the linking mechanism to the CV axle, and effective to rotate upon rotation of the stock axle.

In certain preferred embodiments the first suspension component is an A-arm, and the first steering component is a tie rod. Additionally, the assembly may further include a second suspension component, such as a second A-arm, and a second suspension connection bracket for connecting the second suspension component to the wheel hub assembly. To improve suspension performance, the assembly may further include a shock absorber, such as a shock absorbing strut.

DESCRIPTION OF THE PREFERRED EMBODIMENTS

Figure 1:
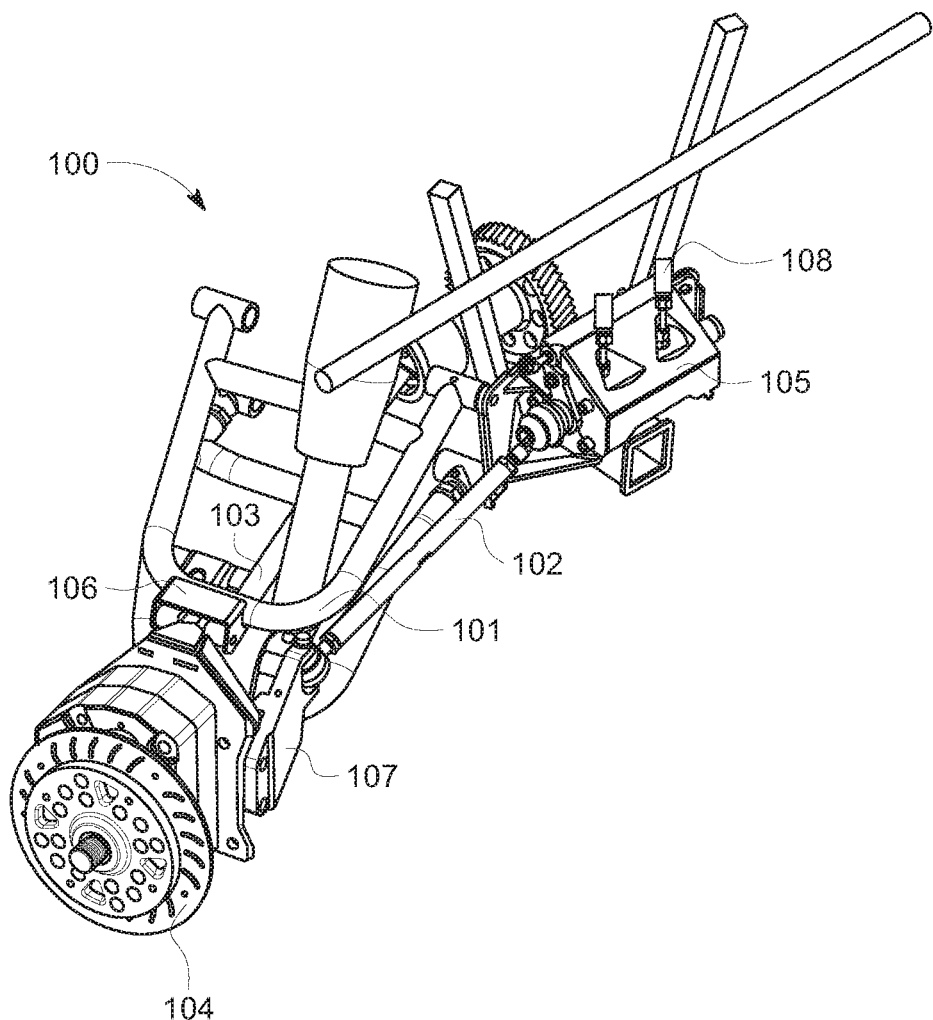
FIG. 1 is a perspective view of the steering and suspension assembly of the present invention, according to one preferred embodiment, viewing the assembly from an upper, center-right perspective with respect to a wheel hub mounted to the assembly.
Figure 2:
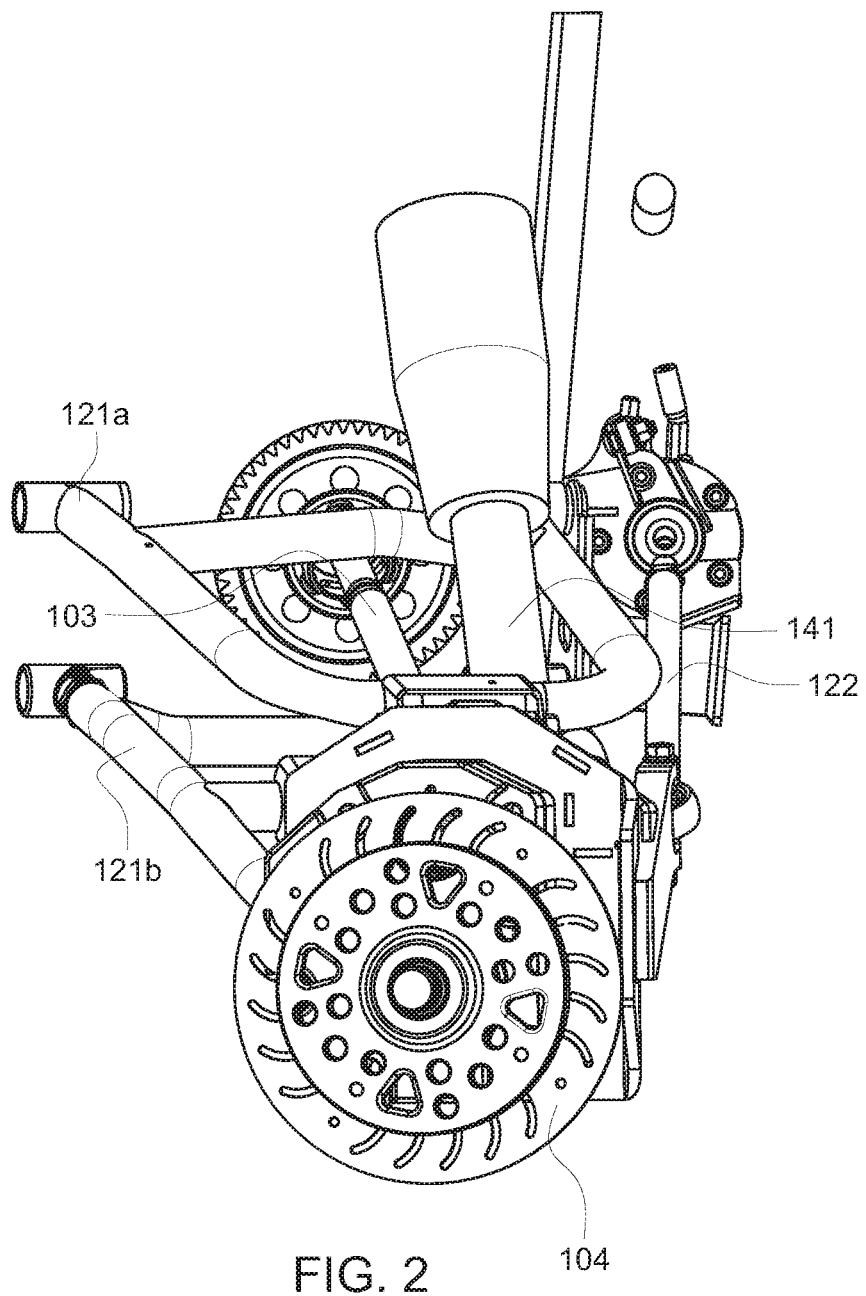
FIG. 2 is another perspective view of the steering and suspension assembly of FIG. 1, viewing the assembly from a central, elevational perspective with respect to a wheel hub mounted to the assembly.
Figure 3:
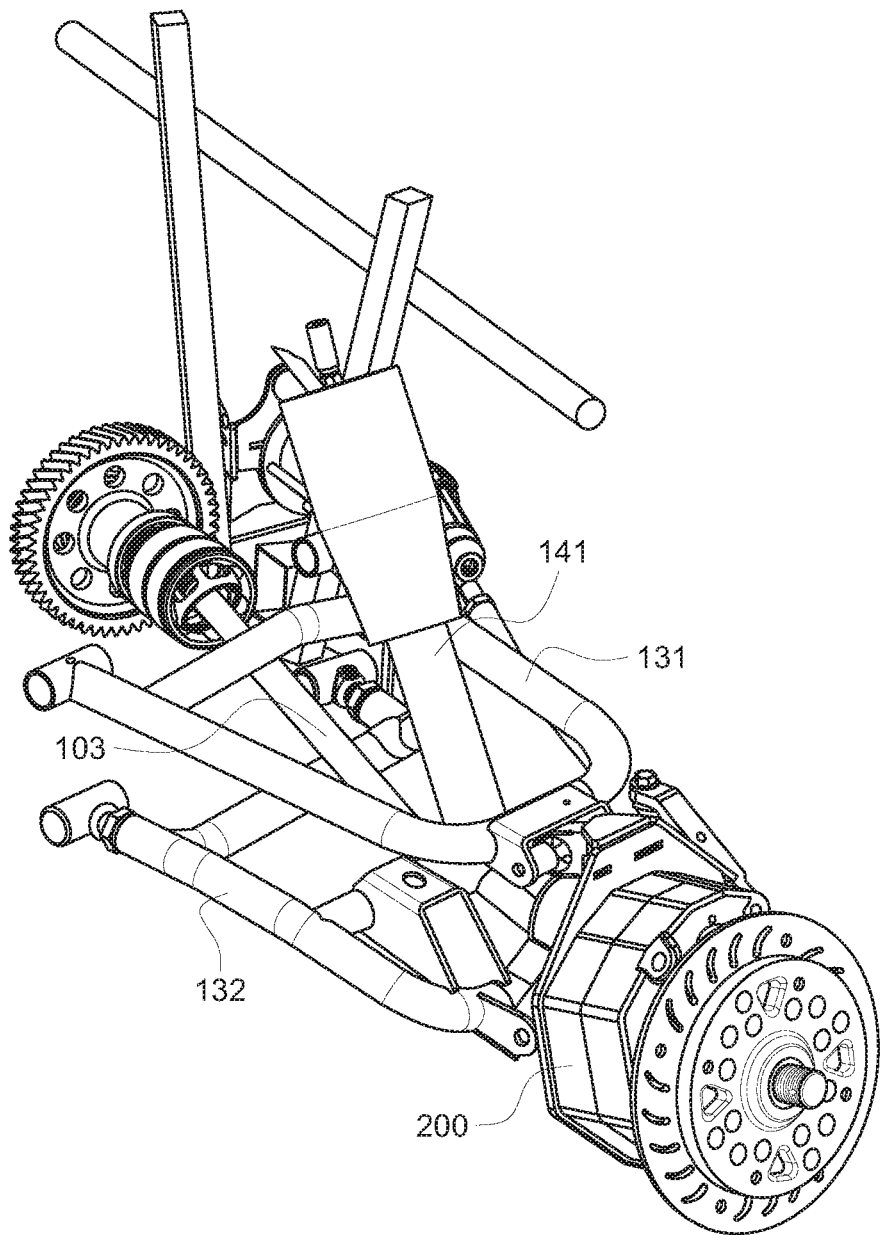
FIG. 3 is another perspective view of the steering and suspension assembly of FIG. 1, viewing the assembly from an upper, center-left perspective with respect to a wheel hub mounted to the assembly.
Figure 4:
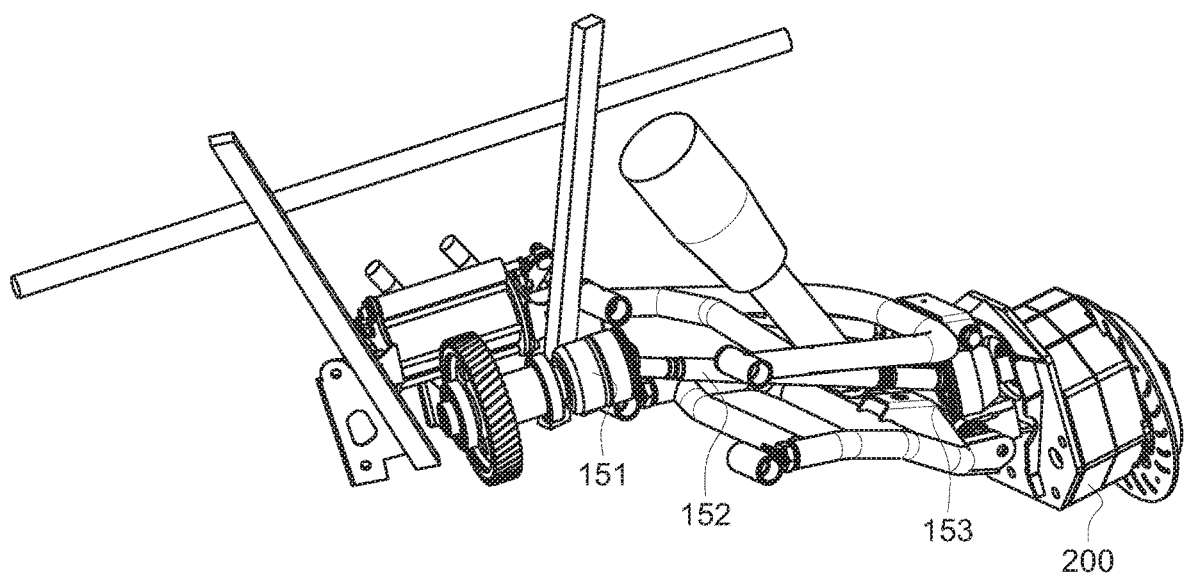
FIG. 4 is another perspective view of the steering and suspension assembly of FIG. 1, viewing the assembly from a central, far-left perspective with respect to a wheel hub mounted to the assembly.
Figure 5:
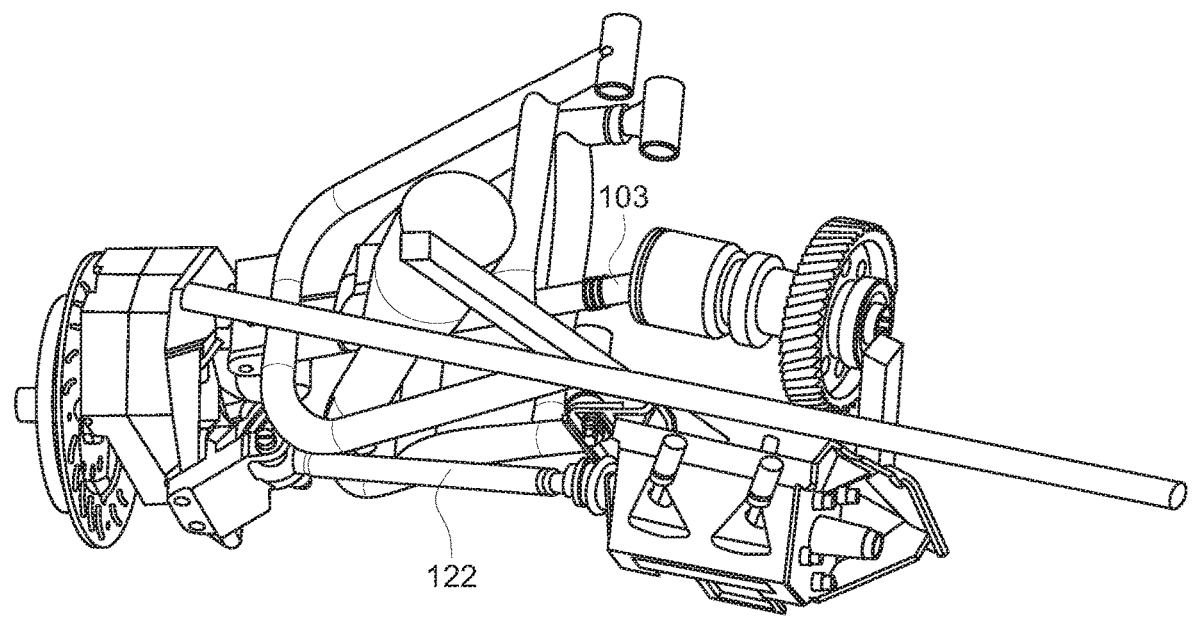
FIG. 5 is another perspective view of the steering and suspension assembly of FIG. 1, viewing the assembly from a lower, far-right perspective with respect to a wheel hub mounted to the assembly.
Figure 6:
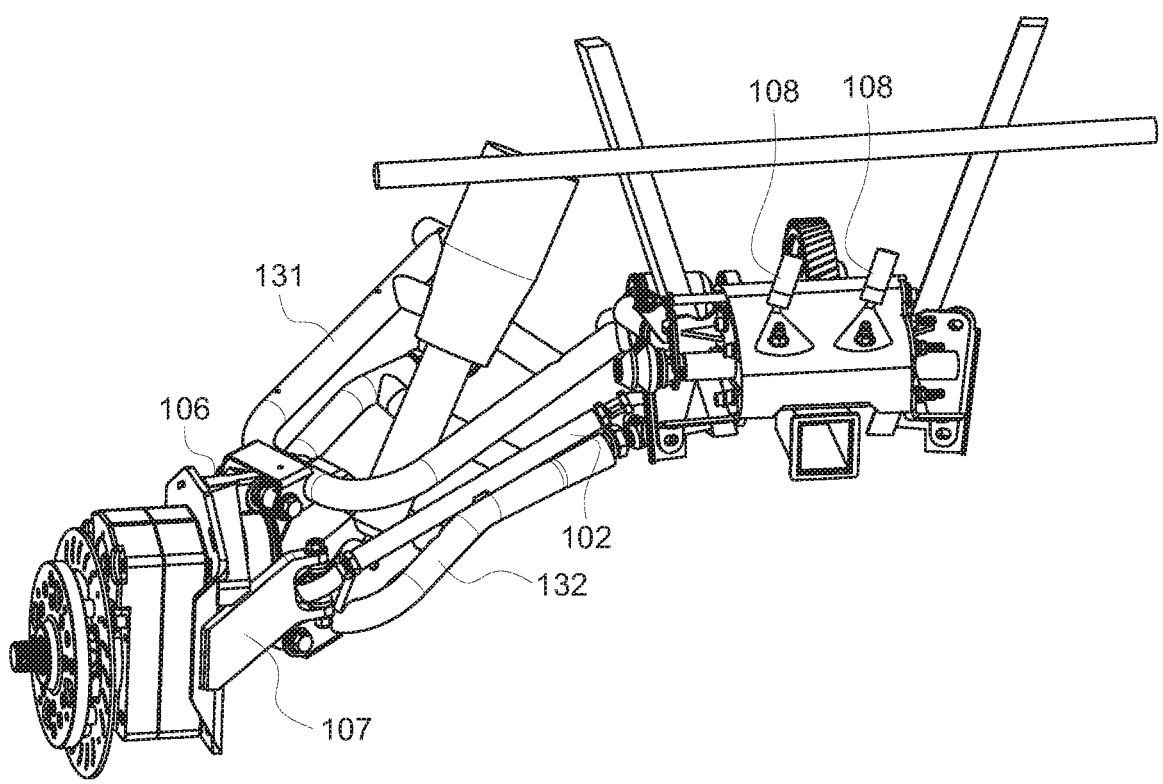
FIG. 6 is another perspective view of the steering and suspension assembly of FIG. 1, viewing the assembly from a central, right-side perspective with respect to a wheel hub mounted to the assembly.
Figure 7:
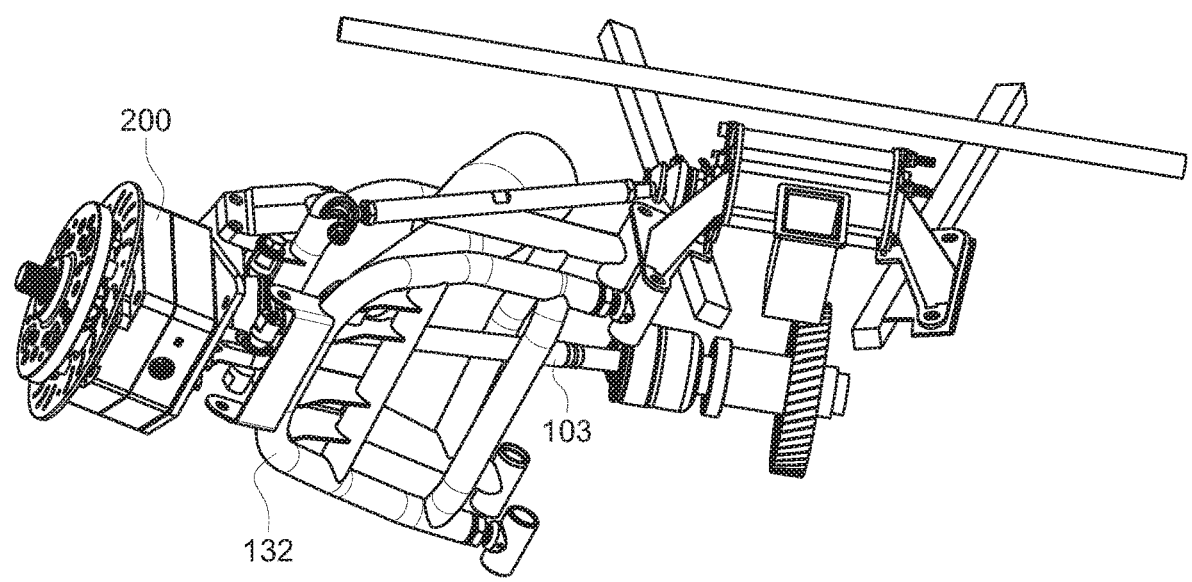
FIG. 7 is another perspective view of the steering and suspension assembly of FIG. 1, viewing the assembly from a lower, right-side perspective with respect to a wheel hub mounted to the assembly.
Figure 8:
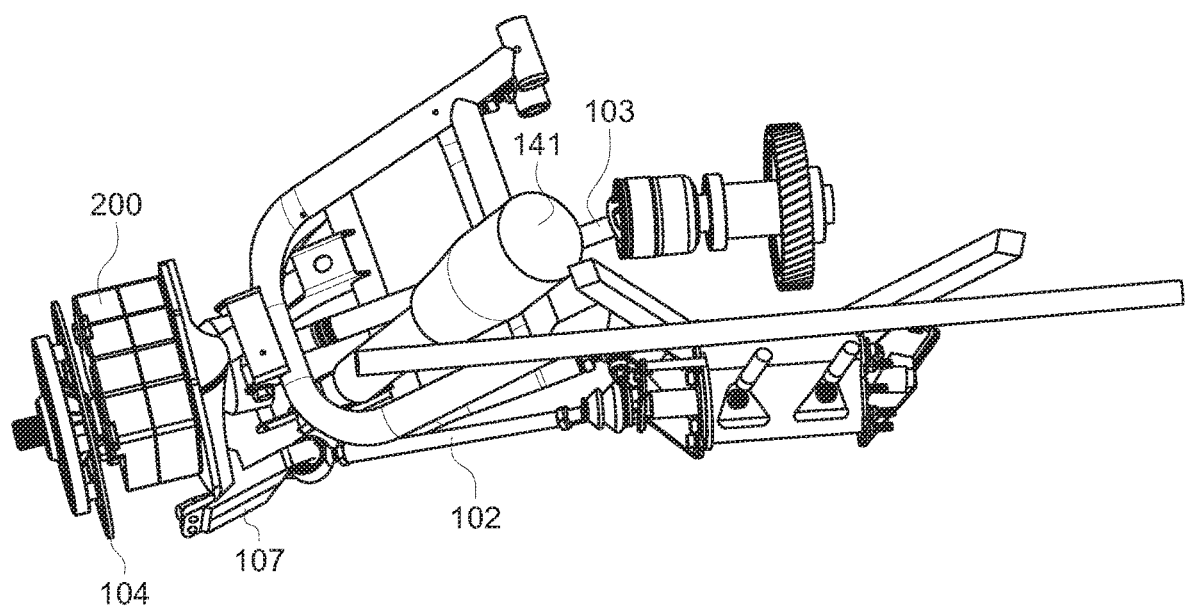
FIG. 8 is another perspective view of the steering and suspension assembly of FIG. 1, viewing the assembly from an upper, right-side perspective with respect to a wheel hub mounted to the assembly.
Figure 9:
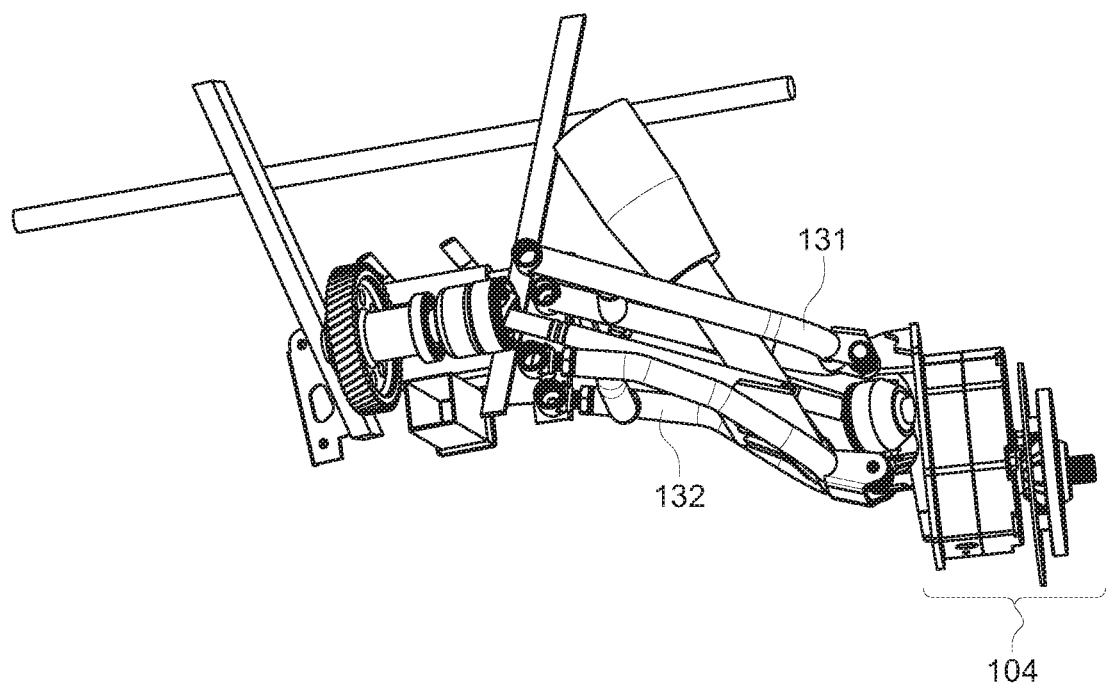
FIG. 9 is another perspective view of the steering and suspension assembly of FIG. 1, viewing the assembly from a lower, left-side perspective with respect to a wheel hub mounted to the assembly.
Figure 10:
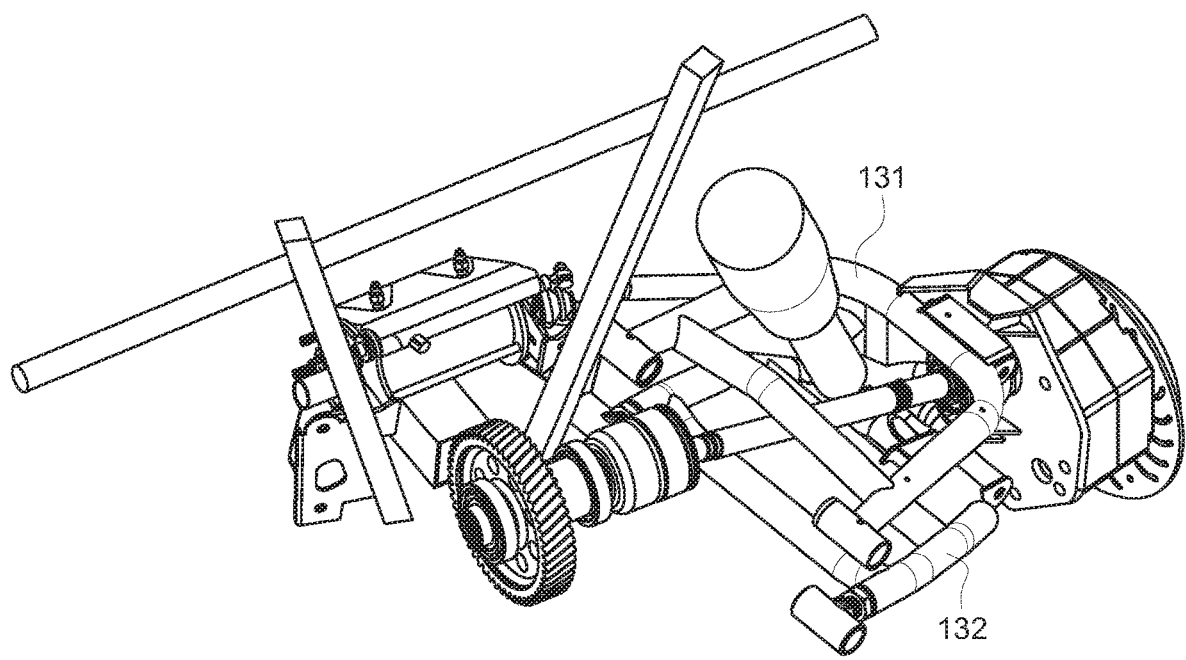
FIG. 10 is another perspective view of the steering and suspension assembly of FIG. 1, viewing the assembly from a rear, left-side perspective with respect to a wheel hub mounted to the assembly.
Figure 11:
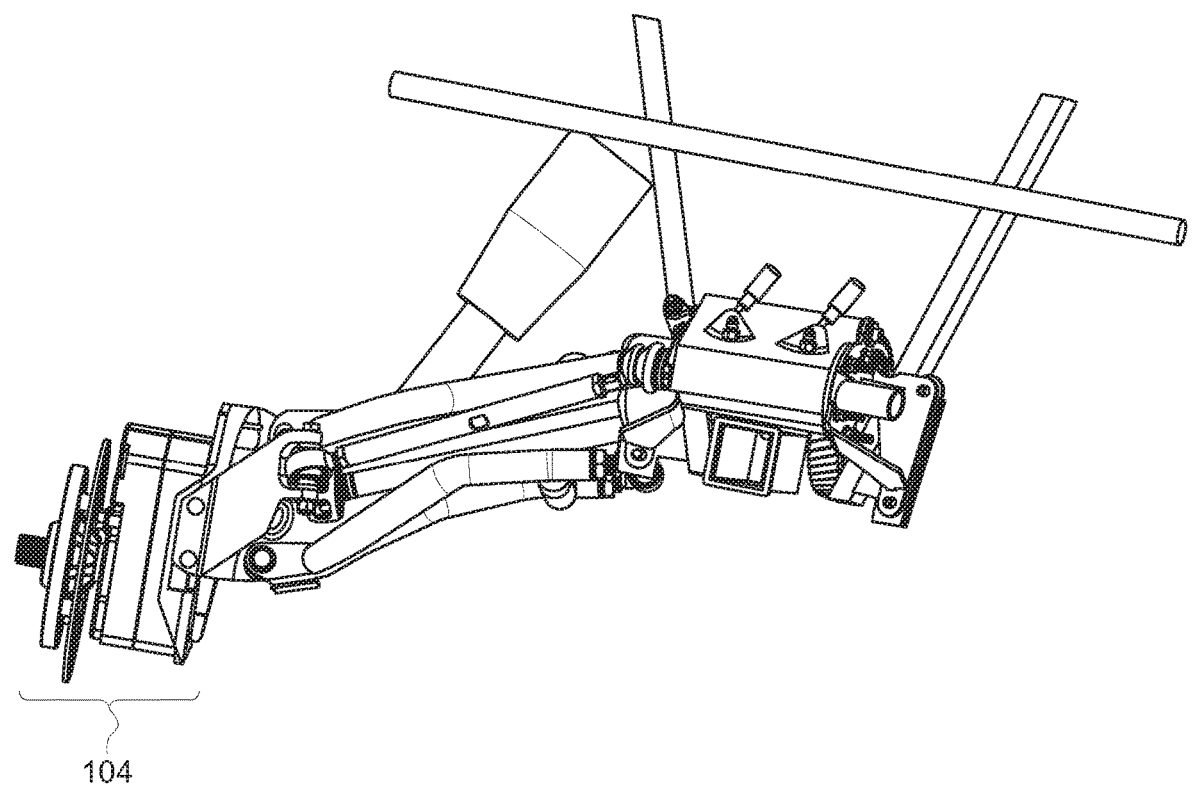
FIG. 11 is another perspective view of the steering and suspension assembly of FIG. 1, viewing the assembly from a right-side perspective with respect to a wheel hub mounted to the assembly.
Figure 12:
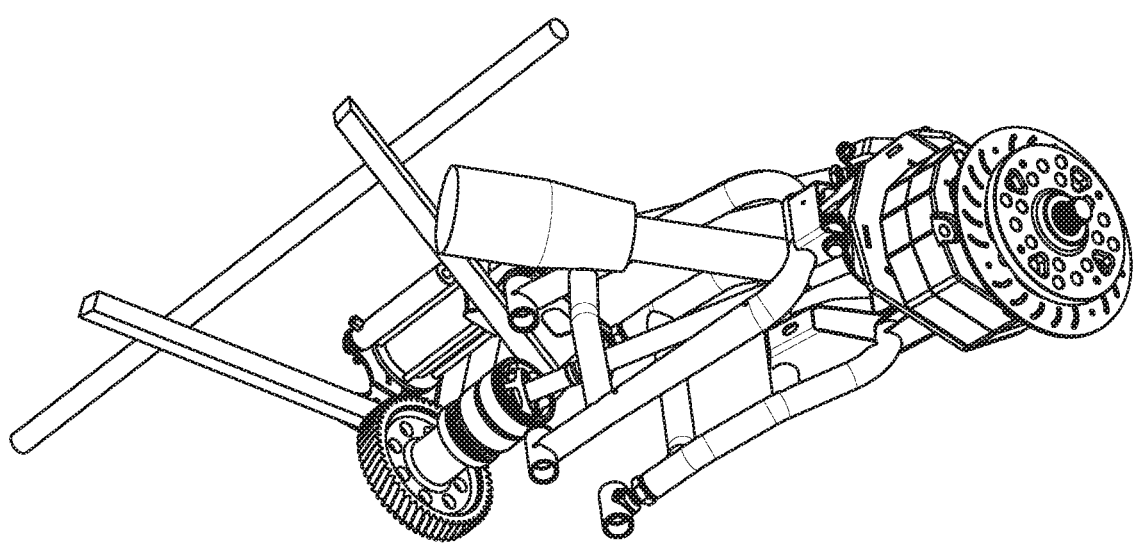
FIG. 12 is another perspective view of the steering and suspension assembly of FIG. 1, viewing the assembly from a left-side perspective with respect to a wheel hub mounted to the assembly, and showing the upper portion of the CV axle.
Figure 13:
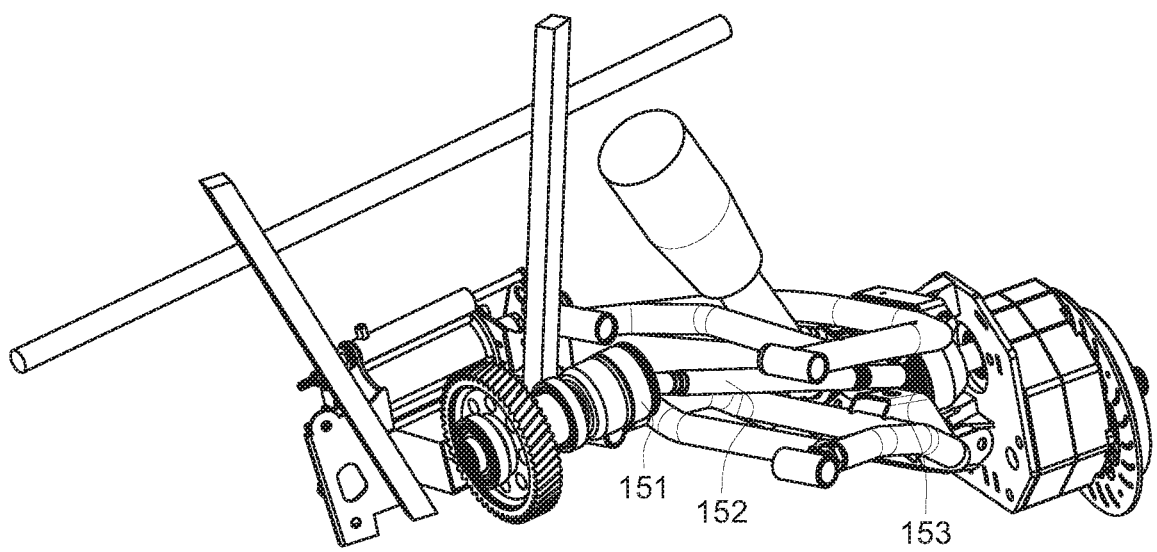
FIG. 13 is another perspective view of the steering and suspension assembly of FIG. 1, viewing the assembly from a left-side perspective with respect to a wheel hub mounted to the assembly, and showing the lower portion of the CV axle.
Figure 14:
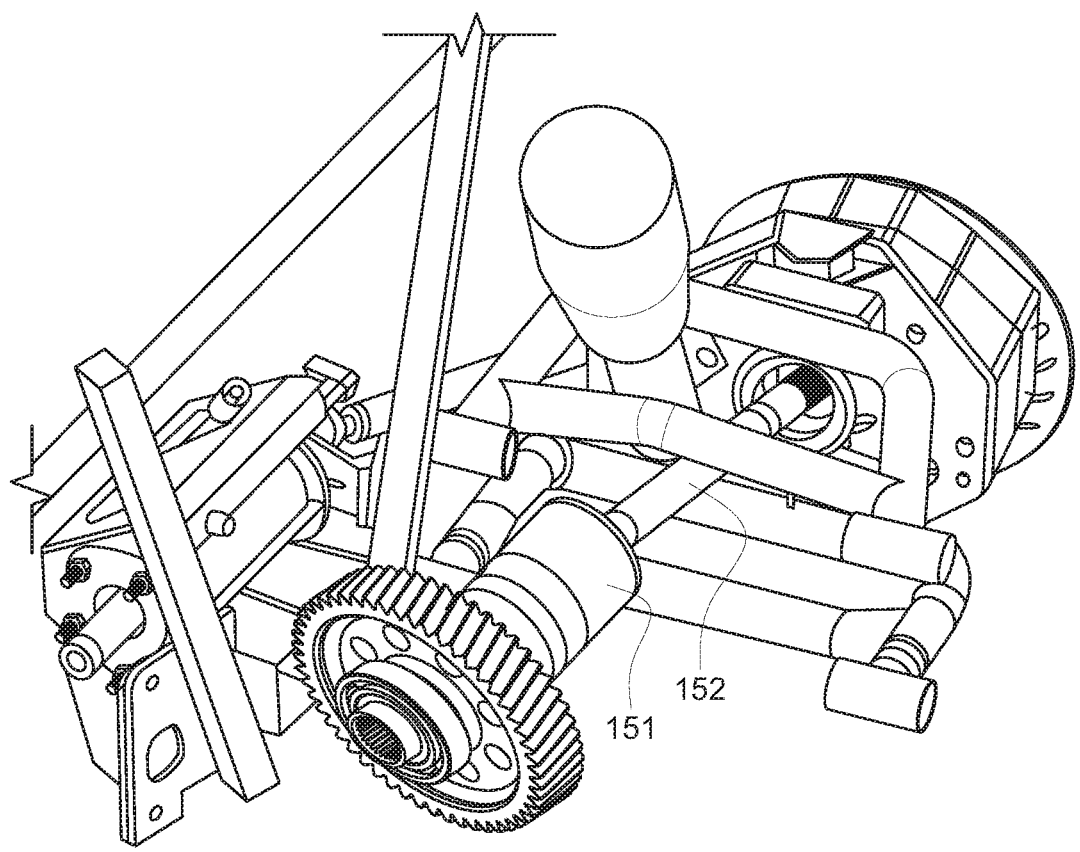
FIG. 14 is another perspective view of the steering and suspension assembly of FIG. 1, viewing the assembly from the rear of the CV axle, and showing the c connection of the lower portion of the CV axle to the portal box and wheel hub.
Figure 15:
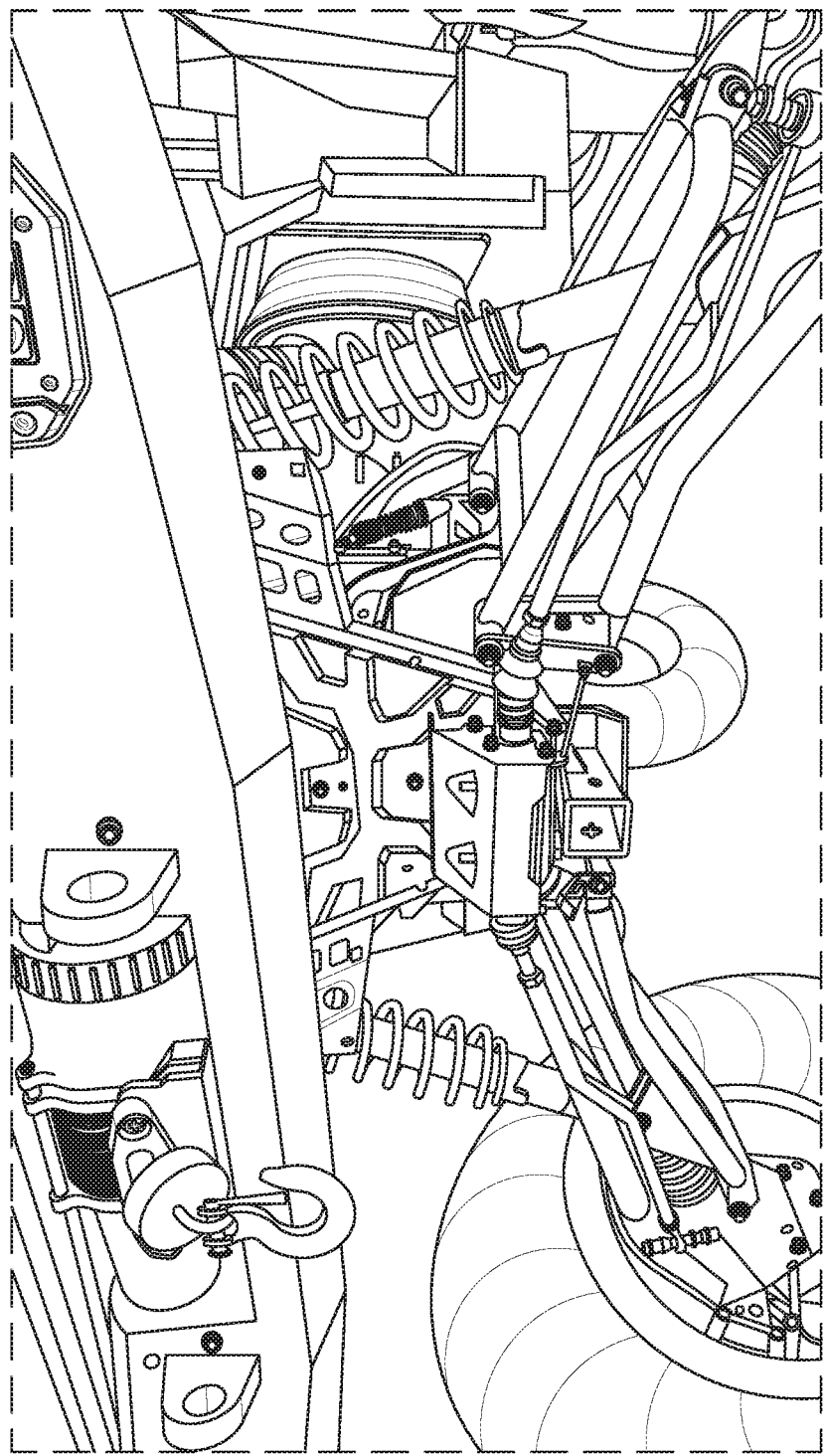
FIG. 15 is a perspective view of the steering and suspension assembly of the present invention, according to one preferred embodiment, viewing the assembly from the rear of the vehicle.

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

In one embodiment the present invention provides a steering and suspension assembly for the rear wheels of an off-road vehicle. The assembly preferably includes:

a) a rear wheel hub assembly effective for mounting and driving the rear wheels of a vehicle;

b) a CV axle having a first end connected to a vehicle drive shaft and having a second end connected to said rear wheel hub assembly;

c) a first suspension component;

d) a first suspension connection bracket for connecting the first suspension component to the wheel hub assembly;

e) a first steering component;

f) a first steering connection bracket for connecting the first steering component to the rear wall of the wheel hub assembly.

g) a hydraulic steering assembly effective to move the first steering component in a first direction for a distance effective to turn the vehicle up to at least 2° in a right-turning direction, and effective to move the first steering component in a second direction for a distance effective to turn the vehicle up to at least 2° in a left-turning direction, and further effective to move the first steering component in whatever direction is needed to steer the rear wheels in any desired direction between and including at least 2° in a right-turning direction and at least 2° in a left-turning direction.

In the most preferred embodiments the hydraulic steering assembly includes:

a) a linear variable inductance transducer (LVIT) adapted to change length according to the direction of travel of the rear wheels of the vehicle and thus adapted to inform the hydraulic steering system of the direction of travel of the rear wheels of the vehicle, with the change in LVIT length or position optionally being outputted to the controller as a voltage;

b) a Hall effect sensor, optionally mounted to the caliper mounting bracket, effective to detect motion as the holes in the rotor rotate, and thus effective to provide high/low signals to the controller, which may use the frequency of these changes to determine current vehicle speed;

c) a controller with a microprocessor and software effective to collect data from the LVIT and the Hall effect sensor, and effective to calculate the appropriate amount of turning that should be performed by the rear wheels of the vehicle, and further effective to output signals to the driver feedback module and trigger signals to the pump solenoid to induce the steering system to turn the rear wheels;

d) a double acting, double ended hydraulic cylinder;

e) a pump effective to provide hydraulic pressure to the hydraulic cylinder;

f) a pump solenoid, which is preferably a double pole, double throw switch that reverses output polarity depending on which of the two coils are charged, with the output closing the power circuit to the pump unit;

g) a driver feedback module, which may be an LED cluster that gives system feedback such as cylinder position, program mode, auto/manual indicator, power indicator, tire size selection, and error codes.

In one preferred embodiment the wheel hub assembly includes a portal gear box. The portal gear box assembly may include: i) a housing having a rear wall, a front wall, and a side wall, wherein the rear wall includes a vehicle axle opening effective to receive the end of said CV axle, and wherein the front wall includes an output shaft opening effective to allow an output shaft to extend outward from the housing; ii) a linking mechanism housed in the housing and effective for linking a CV axle received in the vehicle axle opening to an output shaft; and iii) an output shaft operably connectable via the linking mechanism to the CV axle, and effective to rotate upon rotation of the stock axle.

The inventive assembly uses a CV axle to provide power to the wheel driven by the assembly. As is known to the art, a CV axle transmits power through a variable angle, at constant rotational speed.

The inventive assembly allows the wheels to turn at least 2° in either direction when the assembly is mounted to a wheel hub, and preferably allows the wheels to turn at least 6°, and more preferably at least 10°, in either direction when the assembly is mounted to a wheel hub. The use of rear-wheel CV axles to allow the rear wheels of a ATV/UTV to be steered is one feature that distinguishes the four-wheel steering and suspension assemblies of the present invention from the prior art that used straight axles (i.e., a single, rigid shaft) to provide power to the relevant wheel.

In one preferred embodiment the steering and suspension assembly uses one or more suspension components to support the vehicle so that the CV axle can function properly. In certain preferred embodiments the suspension component comprises an A-arm. Alternatively, other suspension components may be used to support and connect the vehicle to the frame. For example, a shock absorbing strut may be included in the suspension system.

The inventive assembly also uses a hydraulic steering assembly for moving the first steering component a distance effective to turn the vehicle at least 2° in either direction. Most preferably, the hydraulic steering assembly uses a push-rod to move the steering connection bracket closer to, or farther from, the vehicle frame, and thus to turn the wheel left or right. In one preferred embodiment the first steering component is a tie rod. A hydraulic steering box preferably has hydraulic fluid lines to provide the hydraulics needed to move the piston in either direction (out or in) to push or pull the wheel hub, and thus to steer the vehicle. In some preferred embodiments, upper and lower pivot blocks are used to accommodate rear steering utilizing ball joints.

The hydraulic steering assembly is preferably controlled by an electronic steering control system that coordinates with the front-wheel steering to provide the appropriate amount of turn in relation to movement of a steering wheel or other steering mechanism.

In one preferred embodiment the steering and suspension assembly uses a wheel hub assembly to mount the wheel hub to the suspension. Most preferably, the wheel hub assembly is a portal gear box that includes an output axle on which the wheel hub is mounted. As is known to the art, portal boxes are used by ATV and UTV enthusiasts to raise an off-road vehicle higher above the ground so that larger tires can be run on the vehicle. In addition, since larger diameter tires cover a greater distance with each rotation, portal box assemblies typically include gear reduction so that a single rotation of the vehicle power axle results in a slightly lesser rotation of the output axle. Further, the extra length provided by the output axle also typically allows the assembly to widen the wheelbase of the vehicle.

To connect the suspension component to the wheel hub assembly, the inventive steering and suspension assembly uses one or more connection brackets to connect the suspension component(s) to the wheel hub assembly.

As is appreciated by persons skilled in the art, the steering and suspension assembly may include a second suspension component. When needed, a second suspension connection bracket is preferably used to connect the second suspension component to the wheel hub assembly.

In some preferred embodiments the steering and suspension assembly is mounted to or incorporated into a portal gear box assembly (alternatively referred to as a lift, or a portal lift). Portal gear box assemblies are generally known to the art, although a portal gear box utilizing some or all of applicant's improvements to such devices. These portal gear lifts may be original equipment or an after-market improvement to an all-terrain vehicle or a utility task vehicle, such as an ATV or UTV offered by Polaris, Can-Am, Yamaha, Kawasaki, Arctic Cat, Honda, and the like. Portal gear lifts are designed to provide lift to off-road vehicles, while reducing gearing to allow larger tires to be used with good torque.

The portal box preferably has a rear wall that is mountable to mounting hardware, such as a mounting plate, to facilitate mounting the box to the vehicle suspension. Alternatively, integral mounting hardware may be incorporated into the box wall. The box also preferably includes one or more sidewalls and a front cover, thus making a sealed compartment to contain the gearing that is preferably used to connect the stock axle (input shaft) to an output shaft while reducing the gear ratio. An opening for receiving the stock vehicle axle is provided in the box.

The portal gear lift box preferably includes a linking mechanism effective for operably connecting the stock axle shaft to the output shaft. The linking mechanism may comprise one or more gears, which may include an input gear operably linked to the stock axle to rotate upon rotation of the axle, and an output gear operably linked to the output shaft to rotate the shaft upon rotation of the output gear. When the input gear has a smaller diameter and number of teeth than the output gear, a unit rotation of the input gear will cause a smaller rotation of the output gear, thus using the gears to reduce the speed of rotation of the output shaft relative to the stock axle, and allowing larger tires to be run without sacrificing torque.

Referring now to the drawings, FIGS. 1-17 show one embodiment of the steering and suspension assembly of the present invention, particularly as used for the rear wheels of an off-road vehicle. As illustrated in the drawings, steering and suspension assembly 100 comprises:

a) a first suspension component 101;
b) a first steering component 102;
c) a CV axle 103;
d) a wheel hub assembly 104 for mounting a wheel, directly or indirectly, to the CV axle;
e) a hydraulic steering assembly 105 for moving the first steering component a distance effective to turn the vehicle at least 2° in either direction when the assembly is mounted, directly or indirectly, to said wheel hub assembly.
f) a first suspension connection bracket 106 for connecting the first suspension component to the wheel hub assembly; and
g) a first steering connection bracket 107 for connecting the first steering component to the wheel hub assembly.

In the embodiment illustrated in the Figures the first suspension component is an A-arm 121.

In the embodiment illustrated in the Figures the first steering component is a tie rod 122.

In the embodiment illustrated in the Figures, the steering and suspension assembly further includes a hydraulic fluid line 108 for providing hydraulic power sufficient to cause said first steering component to move a distance effective to turn the vehicle at least 2° in either direction. The illustrated hydraulic fluid line provides hydraulic power to a steering component tie rod.

In the embodiment illustrated in the Figures, the assembly further includes a second suspension component 123, and a second suspension connection bracket 124 for connecting the second suspension component to the wheel hub assembly.

In the embodiment illustrated in the Figures, the first suspension component is an upper A-arm 131, and the second suspension component is a lower A-arm 132.

In the embodiment illustrated in the Figures the assembly further includes a shock absorbing strut 141.

It is to be appreciated that the illustrated steering and suspension assembly is preferably effective for moving the first steering component a distance effective to turn the vehicle at least 6° in either direction when the assembly is mounted to a wheel hub. Most preferably, the hydraulic steering assembly is effective for moving the first steering component a distance effective to turn the vehicle at least 10° in either direction when the assembly is mounted to a wheel hub.

The illustrated CV axle comprises an inner CV joint 151 adapted to allow the vehicle's drive shaft to transmit power through a variable angle, at constant rotational speed, from the vehicle's drive shaft to the central axle portion 152 of the CV axle.

Further, the illustrated CV axle comprises an outer CV joint 153 adapted to transmit power through a variable angle, at constant rotational speed, from the central axle portion of the CV axle to the wheel hub assembly.

Figure 16:
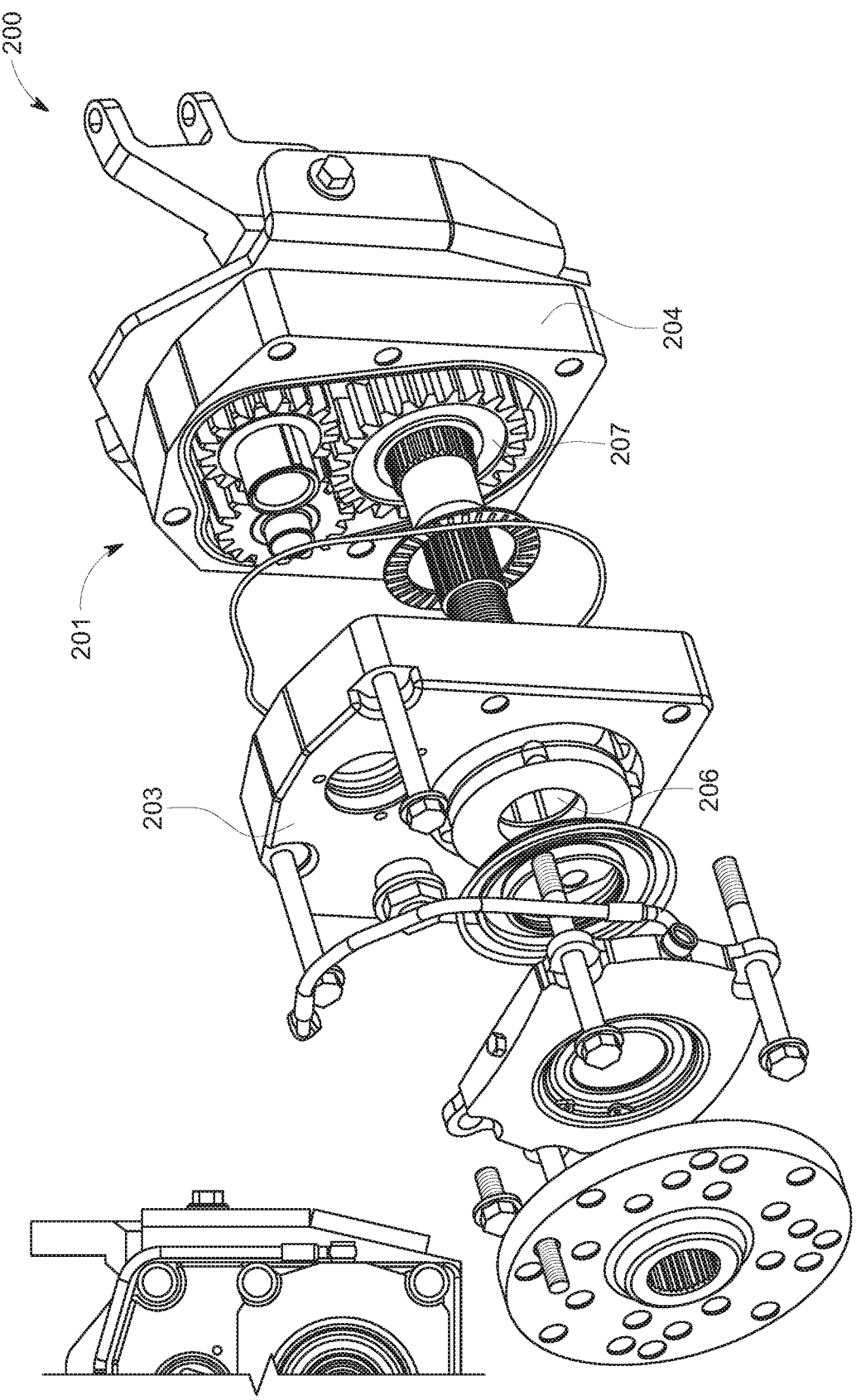
FIG. 16 is a perspective view of an exploded view of a portal box that may be used with the steering and suspension assembly of the present invention, showing the input axle, the output axle, the linking mechanism, and the wheel hub.
Figure 17:
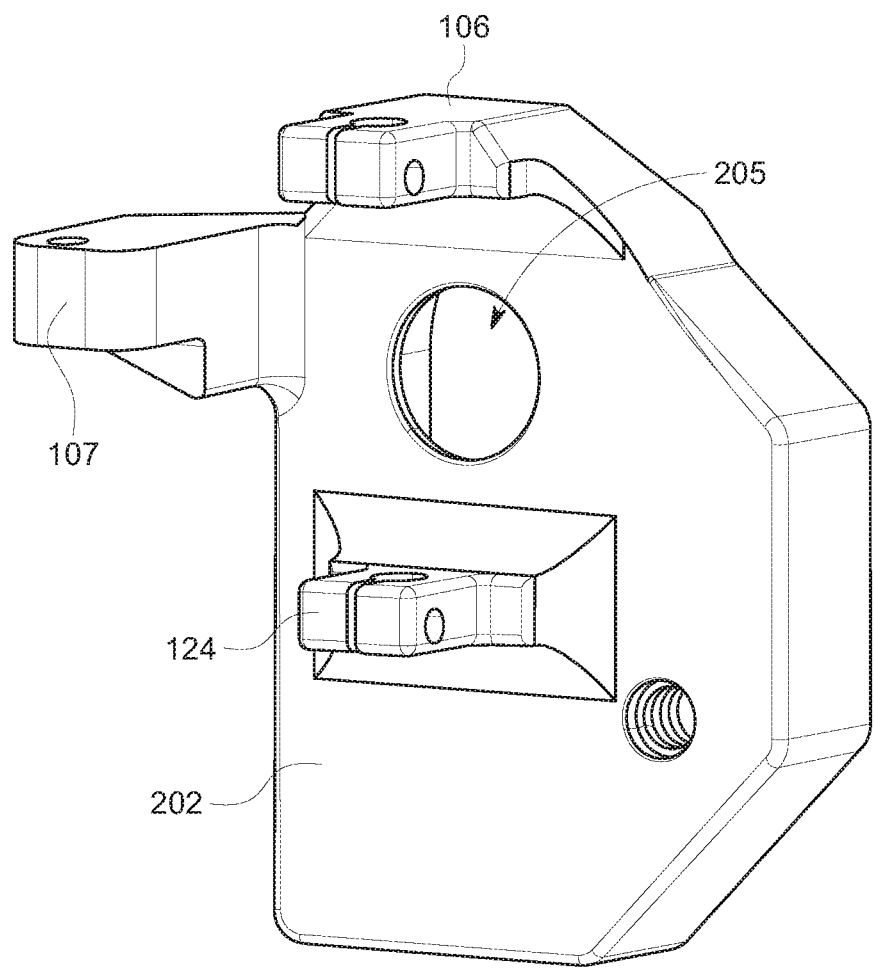
FIG. 17 is a perspective view of one embodiment of the rear wall of a portal box assembly used in some embodiments of the steering and suspension assembly of the present invention, showing unitary suspension and steering mounting brackets.

FIGS. 16 and 17 show more detail about the portal gear box that may be used to provide a wheel hub assembly 104 for mounting a wheel, directly or indirectly, to the CV axle. As illustrated by FIGS. 16-17, wheel hub assembly may comprise a portal box assembly 200. The illustrated portal box assembly 200 comprises:

i) a housing 201 having a rear wall 202, a front wall 203, and a side wall 204, wherein the rear wall includes a vehicle axle opening 205 effective to receive the end of said CV axle, and wherein the front wall includes an output shaft opening 206 effective to allow an output shaft to extend outward from the housing;
  ii) a linking mechanism 207 housed in the housing and effective for linking a CV axle received in the vehicle axle opening to an output shaft;
  iii) an output shaft operably connectable via the linking mechanism to the CV axle, and effective to rotate upon rotation of the stock axle;

FIG. 17 shows an embodiment in which the first suspension connection bracket 106, the second suspension connection bracket 124, and the first steering connection bracket 107 are made integral with the rear wall of the backing plate. In the context of this disclosure, describing mounting brackets as being "integral" with the rear wall means that the brackets and rear wall are formed as a unit, and are not distinct parts, as would be the case with a traditional portal box-plus-backing plate construction. Accordingly, the backing plates used in prior art portal box assemblies are unnecessary, and are thus avoided. This use of a single piece to cover the rear portion of the portal box and to provide a structure for mounting the suspension to the box, provides benefits in strength and structural integrity that are not provided by prior art, two-piece constructions.

The integral brackets are preferably machined into the metal used to form the rear wall of the portal box, as opposed to being bolted on as would be the case if the brackets were made of sheet steel as prior art mounting brackets are. Alternatively, the rear wall/mounting bracket component may be forged, or cast, or otherwise made as a single piece of material.

Figure 18:
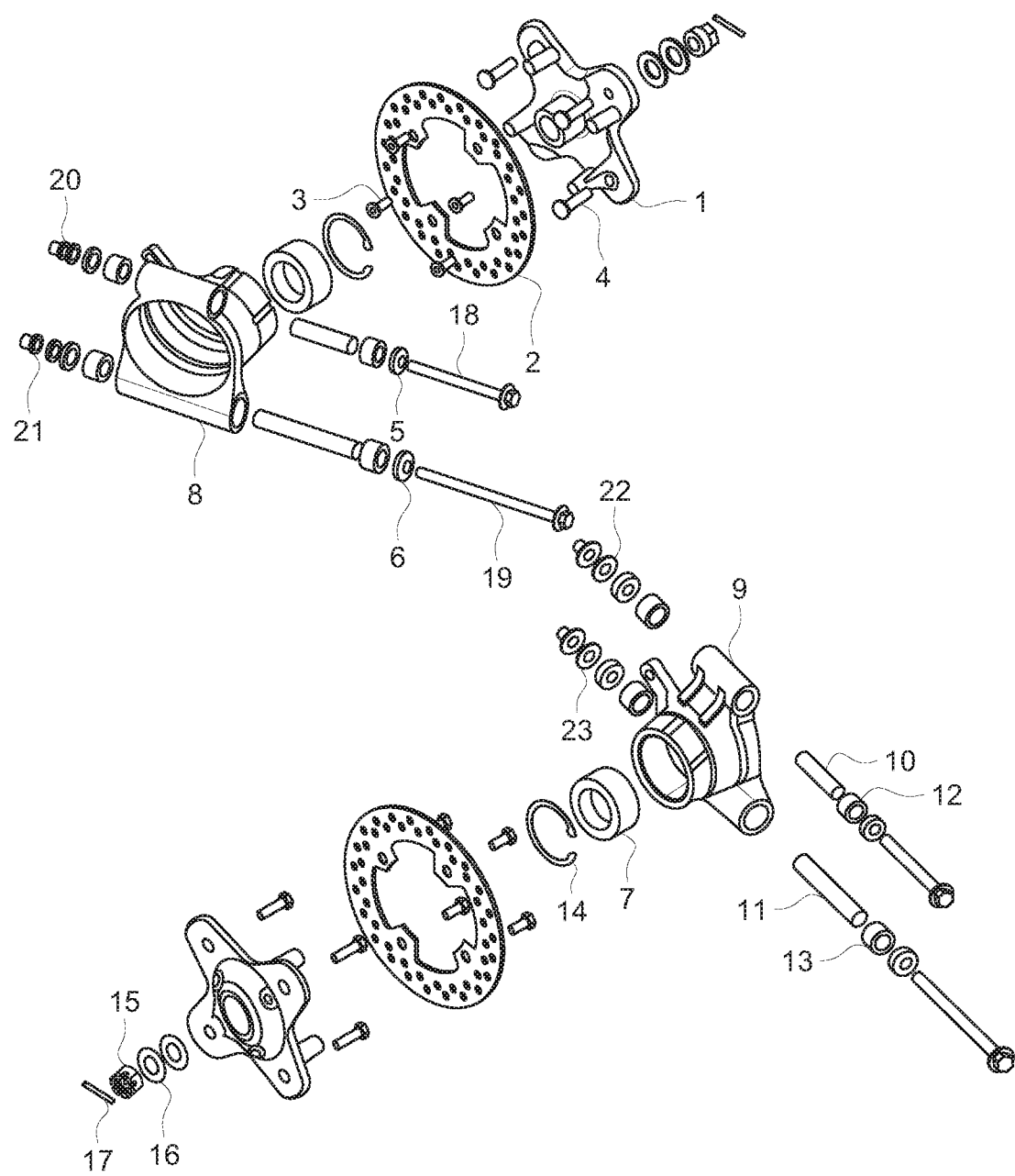
FIG. 18 is an exploded view of one embodiment of a wheel hub assembly that may be used in the steering and suspension assembly of the present invention.

FIG. 18 shows an exploded view of one embodiment of a wheel hub assembly that may be used in the steering and suspension assembly of the present invention, particularly when a portal gear box is not being used. It is to be appreciated that other forms of wheel hub assemblies may additionally or alternatively be used.

Figure 19:
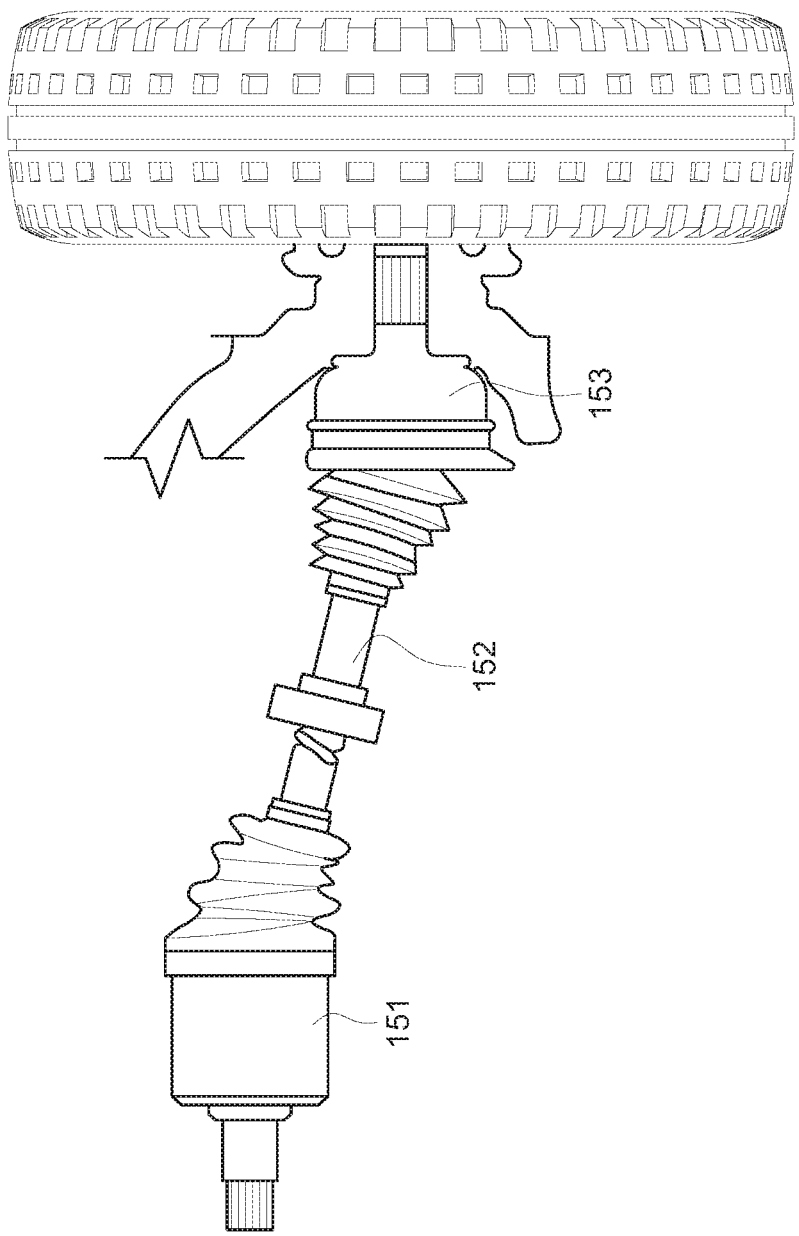
FIG. 19 is a perspective view of one embodiment of a CV axle used in the steering and suspension assembly of the present invention, showing the inner CV joint, the central portion, and the outer CV joint.

FIG. 19 shows a perspective view of one embodiment of a CV axle used in the steering and suspension assembly of the present invention. Inner CV joint 151, central axle portion 152, and outer CV joint 153 are shown.

In some preferred embodiments the assembly includes a centering system effective to assist with centering the steering of the vehicle. The centering system may detect the direction that the rear wheels are being steered, and in particular may detect the variance from straight/center that the rear wheels are being steered, and may assist in returning the rear-wheel steering to its straight and centered position.

In one aspect, the centering system may include a linear variable inductance transducer (LVIT) adapted to change length according to the direction of travel of the rear wheels of the vehicle. The change in LVIT length or position may be outputted to a controller. The LVIT allows the system to know the direction of travel of the rear wheels of the vehicle.

The centering system may also preferably include a Hall effect sensor that outputs a signal to a driver feedback module and trigger signals to a pump solenoid. As is known to the art, a Hall effect sensor measures the magnitude of a magnetic field, and its output voltage is directly proportional to the magnetic field strength through it. When the Hall effect sensor is mounted to the vehicle wheel, such as to the caliper mounting bracket, as the holes in the rotor rotate the Hall effect sensor provides high/low signals to the controller, which may use the frequency of these changes to determine vehicle speed.

The centering system works through the hydraulic cylinder of the hydraulic steering assembly of the present invention. As previously described, the hydraulic steering assembly uses a push-rod to move the steering connection bracket closer to, or farther from, the vehicle frame, and thus to turn the wheel left or right. In one preferred embodiment the first steering component is a tie rod. A hydraulic steering box preferably has hydraulic fluid lines to provide the hydraulics needed to move the piston in either direction (out or in) to push or pull the wheel hub, and thus to steer the vehicle. In some preferred embodiments, upper and lower pivot blocks are used to accommodate rear steering utilizing ball joints. A pump may be used to provide hydraulic pressure to the hydraulic cylinder.

The hydraulic cylinder may be a double acting, double ended hydraulic cylinder to allow pressure to be applied in either of two directions. Accordingly, the hydraulic cylinder may cause the controlled wheel(s) to be turned either to the left or to the right, according to the motion applied to a steering wheel and transmitted to the cylinder.

The hydraulic steering assembly is preferably controlled by an electronic steering control system that coordinates with the front-wheel steering to provide the appropriate amount of turn in relation to movement of a steering wheel or other steering mechanism. A microprocessor with software that collects data from the LVIT and Hall Effect Sensor may be used. The microprocessor may output various signals (e.g., LED signals) to a driver feedback module and trigger signals to the pump solenoid.

A driver feedback module may also be included. For example, an LED cluster may be used to give system feedback such as: cylinder position; program mode; auto/manual selector and setting; power indicator; tire size selection; and error codes as needed.

In some preferred embodiments the centering system may include:

a) an LVIT sensor with a linear variable inductance transducer mounted axially parallel to the cylinder with one end fixed to the cylinder base, and other end fixed to one end of the cylinder rod, such that as the cylinder moves, the LVIT changes length, with the change in LVIT length or position optionally being outputted to the controller as a voltage;
  b) a Hall effect sensor, preferably mounted to the caliper mounting bracket, that detects motion as the holes in the rotor rotate and provides high/low signals to the controller, which may use the frequency of these changes to determine current vehicle speed;
  c) a controller with a microprocessor and software that collects data from the LVIT and the Hall effect sensor, and outputs various LED signals to the driver feedback module and trigger signals to the pump solenoid;
  d) a pump solenoid, which is preferably a double pole, double throw switch that reverses output polarity depending on which of the two coils are charged, with the output closing the power circuit to the pump unit;
  e) a pump unit effective to provide hydraulic pressure to a hydraulic cylinder;
  f) a double acting, double ended hydraulic cylinder;
  g) a driver feedback module, which may be an LED cluster that gives system feedback such as cylinder position, program mode, auto/manual indicator, power indicator, tire size selection, and error codes.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the described or illustrated features. For example, the present invention includes devices and methods comprising any or all of the features described or illustrated in specification or drawings, and the present invention includes devices and methods consisting essentially of any or all of the features illustrated in the specification or drawings. Additionally, any or all of the features and/or embodiments disclosed herein may be combined with any or all of the other features and/or embodiments disclosed herein to provide a device or method that comprises or consists essentially of such features.

Finally, the grammatical device "and/or" (such as in "A and/or B") is used in this disclosure to mean A alone, or B alone, or both A and B.

The invention claimed is:

1. A steering and suspension assembly for the rear wheels of an off-road vehicle, comprising:
   a) a first suspension component;
   b) a first steering component;
   c) a CV axle;
   d) a wheel hub assembly for mounting a wheel, directly or indirectly, to the CV axle;
   e) a hydraulic steering assembly for moving the first steering component a distance effective to turn the vehicle at least 2° in either direction when the assembly is mounted, directly or indirectly, to said wheel hub assembly;
   f) a first suspension connection bracket for connecting the first suspension component to the wheel hub assembly;
   g) a first steering connection bracket for connecting the first steering component to the wheel hub assembly;
   h) a double-acting, double-ended hydraulic cylinder comprising a shaft inside a cylinder body;
   i) a pump unit effective to provide hydraulic pressure to the hydraulic cylinder;
   j) a pump solenoid effective to cause hydraulic pressure to be applied to the hydraulic cylinder shaft, and thus to cause the hydraulic cylinder shaft to move within the hydraulic cylinder; and
   k) a centering system; wherein the centering system includes:
      i) a direction sensor adapted to detect the variance from straight/center that the rear wheels are being steered; and
      ii) a controller that collects data from the direction sensor and outputs signals to the hydraulic steering assembly to cause the steering assembly to move toward a centered steering direction.

2. A steering and suspension assembly according to claim 1 wherein said first suspension component is an A-arm.

3. A steering and suspension assembly according to claim 1 wherein said first steering component is a tie rod.

4. A steering and suspension assembly according to claim 1 and further including a hydraulic fluid line for providing hydraulic power sufficient to cause said first steering component to move a distance effective to turn the vehicle at least 2° in either direction.

5. A steering and suspension assembly according to claim 4 wherein said hydraulic fluid line provides hydraulic power to a steering component tie rod.

6. A steering and suspension assembly according to claim 1 wherein the assembly further includes a second suspension component, and a second suspension connection bracket for connecting the second suspension component to the wheel hub assembly.

7. A steering and suspension assembly according to claim 1 wherein said first suspension component is an upper A-arm, and said second suspension component is a lower A-arm.

8. A steering and suspension assembly according to claim 1 wherein the assembly further includes a shock absorbing strut.

9. A steering and suspension assembly according to claim 1 wherein the hydraulic steering assembly is effective for moving the first steering component a distance effective to turn the vehicle at least 6° in either direction when the assembly is mounted to a wheel hub.

10. A steering and suspension assembly according to claim 1 wherein the hydraulic steering assembly is effective for moving the first steering component a distance effective to turn the vehicle at least 10° in either direction when the assembly is mounted to a wheel hub.

11. A steering and suspension assembly according to claim 1 wherein said wheel hub assembly comprises a portal box assembly.

12. A steering and suspension assembly according to claim 1 wherein the CV axle comprises an inner CV joint adapted to allow the vehicle's drive shaft to transmit power through a variable angle, at constant rotational speed, from the vehicle's drive shaft to the central axle portion of the CV axle.

13. A steering and suspension assembly according to claim 1 wherein the CV axle comprises an outer CV joint adapted to transmit power through a variable angle, at constant rotational speed, from the central axle portion of the CV axle to the wheel hub assembly.

14. A steering and suspension assembly according to claim 1 wherein said portal box assembly comprises:
   i) a housing having a rear wall, a front wall, and a side wall, wherein the rear wall includes a vehicle axle opening effective to receive the end of said CV axle, and wherein the front wall includes an output shaft opening effective to allow an output shaft to extend outward from the housing;
   ii) a linking mechanism housed in the housing and effective for linking a CV axle received in the vehicle axle opening to an output shaft;
   iii) an output shaft operably connectable via the linking mechanism to the CV axle, and effective to rotate upon rotation of the stock axle.

15. A steering and suspension assembly according to claim 1, wherein the wheel hub assembly comprises a portal box assembly, comprising:
   i) a housing having a rear wall, a front wall, and a side wall, wherein the rear wall includes a vehicle axle opening effective to receive the end of said CV axle, and wherein the front wall includes an output shaft opening effective to allow an output shaft to extend outward from the housing;
   ii) a linking mechanism housed in the housing and effective for linking a CV axle received in the vehicle axle opening to an output shaft; and iii) an output shaft operably connectable via the linking mechanism to the CV axle, and effective to rotate upon rotation of the stock axle.

16. A steering and suspension assembly according to claim 1 wherein the hydraulic steering assembly includes a shaft positioned inside a hydraulic cylinder, and wherein the direction sensor detects the position of the shaft inside the hydraulic cylinder.

17. A steering and suspension assembly for the rear wheels of an off-road vehicle, comprising:
   a) a first suspension component;
   b) a first steering component;
   c) a CV axle;
   d) a wheel hub assembly for mounting a wheel, directly or indirectly, to the CV axle;
   e) a hydraulic steering assembly for moving the first steering component a distance effective to turn the vehicle at least 2° in either direction when the assembly is mounted, directly or indirectly, to said wheel hub assembly.
   f) a first suspension connection bracket for connecting the first suspension component to the wheel hub assembly; and
   g) a first steering connection bracket for connecting the first steering component to the wheel hub assembly;
   wherein the wheel hub assembly comprises a portal box assembly, comprising:
      i) a housing having a rear wall, a front wall, and a side wall, wherein the rear wall includes a vehicle axle opening effective to receive the end of said CV axle, and wherein the front wall includes an output shaft opening effective to allow an output shaft to extend outward from the housing;
      ii) a linking mechanism housed in the housing and effective for linking a CV axle received in the vehicle axle opening to an output shaft; and
      iii) an output shaft operably connectable via the linking mechanism to the CV axle, and effective to rotate upon rotation of the CV axle;
   wherein the assembly further includes a centering system;
   wherein the centering system includes:
      a) a linear variable inductance transducer (LVIT) sensor with a linear variable inductance transducer mounted such that as the cylinder moves, the LVIT changes length, with the change in LVIT length or position optionally being outputted to the controller as a voltage;
      b) a Hall effect sensor adapted to detect motion as the holes in the rotor rotate, and effective to provide high/low signals to a controller;
      c) a controller with a microprocessor that collects data from the LVIT and the Hall effect sensor to determine current vehicle speed, and to output signals to a driver feedback module, and to a pump solenoid;
      d) a pump solenoid effective to reverse output polarity depending on which of two coils are charged, with the output closing the power circuit to the pump unit;
      e) a pump unit effective to provide hydraulic pressure to a hydraulic cylinder;
      f) a double-acting, double-ended hydraulic cylinder;
      g) a driver feedback module effective to gives system feedback to a driver of a vehicle using the assembly.

* * * * *